US012744749B2

(12) United States Patent
Roweth et al.

(10) Patent No.: US 12,744,749 B2
(45) Date of Patent: Sep. 22, 2026

(54) NETWORK SWITCH WITH HYBRID ARCHITECTURE

(71) Applicant: Hewlett Packard Enterprise Development LP, Spring, TX (US)

(72) Inventors: Duncan Roweth, Bristol (GB); Timothy J. Johnson, Madison, WI (US); Abdulla M. Bataineh, Seattle, WA (US); Jonathan Paul Beecroft, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 426 days.

(21) Appl. No.: 18/480,217

(22) Filed: Oct. 3, 2023

(65) Prior Publication Data

US 2025/0112876 A1 Apr. 3, 2025

(51) Int. Cl.

*H04L 49/90* (2022.01)
*H04L 49/00* (2022.01)
*H04L 49/101* (2022.01)

(52) U.S. Cl.

CPC ........ *H04L 49/9026* (2013.01); *H04L 49/101* (2013.01); *H04L 49/3027* (2013.01)

(58) Field of Classification Search

CPC ............... H04L 49/101; H04L 49/3027; H04L 49/9026

See application file for complete search history.

(56) References Cited

U.S. PATENT DOCUMENTS 5,414,703 A * 5/1995 Sakaue ................. H04L 49/256 370/428
5,915,088 A * 6/1999 Basavaiah ......... G06F 15/17381 712/28
6,160,812 A * 12/2000 Bauman ................. H04L 47/50 710/39
6,185,221 B1 * 2/2001 Aybay ................... H04L 47/629 709/240
6,195,335 B1 * 2/2001 Calvignac ........... H04L 12/5601 370/429
6,260,099 B1 * 7/2001 Gilbertson .......... G06F 13/1657 710/39

(Continued)

OTHER PUBLICATIONS

Juniper Networks, "Understanding CoS Virtual Output Queues (VOQs)", https://www.juniper.net/documentation/us/en/software/junos/traffic-mgmt-qfx/topics/concept/cos-qfx-series-voq-understanding.html (accessed Aug. 16, 2023), 7 pages.

*Primary Examiner* — Melanie Jagannathan
(74) *Attorney, Agent, or Firm* — Slater Matsil, LLP

(57) ABSTRACT

A network switch has a packet pulling architecture, and also supports packet pushing. In an example implementation, a device includes: an output buffer; a data crossbar connected to the output buffer; an input buffer connected to the data crossbar; an input queue; a request crossbar connected to the input queue; and an output queue. The input queue is configured to transfer a packet from the input buffer to the output buffer over the data crossbar in response to the packet being eligible for packet pushing, and to send a push request in parallel with transferring the packet to the output buffer. The output queue is configured to receive the push request from the input queue over the request crossbar, and to control reading of the packet from the output buffer in response to granting the push request.

20 Claims, 7 Drawing Sheets

(56) References Cited

U.S. PATENT DOCUMENTS 6,621,812 B1 * 9/2003 Chapman ................ H04L 65/70 370/356
7,102,999 B1 * 9/2006 Sindhu ............... H04Q 3/54591 370/235
7,158,512 B1 * 1/2007 Kamhine .............. H04L 49/254 370/398
7,221,650 B1 * 5/2007 Cooper ................. H04L 49/555 370/414
7,237,016 B1 * 6/2007 Schober .............. H04L 67/1097 718/103
7,263,097 B1 * 8/2007 Ornes .................... H04Q 3/521 370/386
7,339,943 B1 * 3/2008 Mammen ................ H04L 49/50 370/414
7,519,066 B1 * 4/2009 Park .................... H04L 49/3009 370/428
7,522,527 B2 * 4/2009 Jun ......................... H04L 49/45 370/414
7,590,764 B2 * 9/2009 Rooney ............... G06F 13/4059 710/5
7,613,183 B1 * 11/2009 Brewer ................. H04J 3/0605 370/395.51
7,647,435 B2 * 1/2010 Check ..................... G06F 13/36 710/29
7,802,001 B1 * 9/2010 Petry ...................... H04L 47/125 709/227
8,400,915 B1 * 3/2013 Brown .................... H04L 47/39 370/429
8,671,220 B1 * 3/2014 Garg ....................... H04L 47/10 709/215
9,641,465 B1 * 5/2017 Gabbay ................... H04L 49/90
11,240,151 B2 * 2/2022 Frink .................. H04L 49/3027
2002/0097733 A1 * 7/2002 Yamamoto ............. H04L 45/00 370/428
2003/0142102 A1 * 7/2003 Emberling ............... G09G 5/39 345/540
2003/0204695 A1 * 10/2003 Park .................... G06F 11/2097 711/167
2004/0085979 A1 * 5/2004 Lee ....................... H04L 49/254 370/413
2004/0103249 A1 * 5/2004 Lin ..................... G06F 13/4059 711/147
2004/0225822 A1 * 11/2004 Takeda ................ G06F 13/4059 710/310
2005/0152352 A1 * 7/2005 Jun ......................... H04L 47/50 370/388
2006/0002412 A1 * 1/2006 Bose ....................... H04L 49/45 370/412
2006/0165112 A1 * 7/2006 Varma ..................... H04L 45/62 370/242
2009/0089478 A1 * 4/2009 Singh .................. G06F 13/4022 710/317
2011/0035530 A1 * 2/2011 Takagi .................... H04L 49/25 710/317
2011/0185125 A1 * 7/2011 Jain ..................... G06F 12/0811 711/E12.024
2013/0047034 A1 * 2/2013 Salomon ............ G06Q 20/3224 709/217
2013/0083793 A1 * 4/2013 Lea ......................... H04L 49/25 370/388
2014/0064269 A1 * 3/2014 Hamdi .................... H04L 49/25 370/355
2014/0161135 A1 * 6/2014 Acharya ............. H04L 47/6255 370/412
2014/0269751 A1 * 9/2014 Koka .................. H04L 47/6205 370/413
2015/0249603 A1 * 9/2015 Tompkins ............. H04L 45/566 370/392
2015/0278135 A1 * 10/2015 Chrysos .............. G06F 13/4022 710/113
2015/0281126 A1 * 10/2015 Regula .................... H04L 67/55 709/212
2015/0363324 A1 * 12/2015 Joshi ..................... G06F 3/0617 711/141
2016/0057069 A1 * 2/2016 Mirza ................. H04L 49/3072 370/412
2016/0124772 A1 * 5/2016 Mirza ..................... H04L 69/22 718/104
2016/0191422 A1 * 6/2016 Srinivasan ............ H04L 49/101 370/413
2017/0046128 A1 * 2/2017 Brooks ..................... G06F 7/52
2017/0171882 A1 * 6/2017 Sundararajan .... H04W 72/1268
2017/0289242 A1 * 10/2017 Keppel ............... H04L 67/1008
2017/0322768 A1 * 11/2017 Brooks ................... G06F 7/483
2018/0049208 A1 * 2/2018 Ozturk ................ H04L 43/0882
2019/0042410 A1 * 2/2019 Gould ................. G06F 12/0895
2019/0294575 A1 * 9/2019 Dennison .............. G06F 9/3877
2019/0303297 A1 * 10/2019 Fleming, Jr. ........ G06F 13/1668
2020/0174828 A1 * 6/2020 Manula ................. G06F 9/3877
2021/0255905 A1 * 8/2021 Manula ................. G06F 9/5044
2021/0314680 A1 * 10/2021 Szymanski ........ H04Q 11/0062
2022/0210094 A1 6/2022 Bataineh et al.
2022/0210487 A1 * 6/2022 Hassler .............. H04N 21/2225
2022/0321498 A1 * 10/2022 DiFerdinando ....... H04L 49/101
2022/0321499 A1 * 10/2022 DiFerdinando ......... H04L 45/66
2023/0030497 A1 * 2/2023 Tabatabaee ............. H04L 47/12
2023/0054059 A1 * 2/2023 Torudbakken .......... H04L 12/66
2023/0070690 A1 * 3/2023 Mugu ..................... H04L 47/39
2024/0121320 A1 * 4/2024 Agarwal ............. H04L 49/9015
2024/0281249 A1 * 8/2024 Appu ...................... G06F 9/546

* cited by examiner

NETWORK SWITCH WITH HYBRID ARCHITECTURE

STATEMENT OF GOVERNMENT-FUNDED RESEARCH

This invention was made with Government support under Contract Number H98230-23-C-0350 awarded by the Maryland Procurement Office. The Government has certain rights in this invention.

BACKGROUND

Network switching is a fundamental concept in computer networking that involves the forwarding of data packets between devices within a network. A network switch analyzes an incoming packet's destination and uses this information to make forwarding decisions, thus performing data transmission within the network. Network switches reduce network congestion and improve overall efficiency compared to older hub-based networks. Latency, which is the delay between data transmission and reception, is an important factor in network switching performance, as lower latency results in faster and more responsive communication between devices.

BRIEF DESCRIPTION OF THE DRAWINGS

Aspects of the present disclosure are best understood from the following detailed description when read with the accompanying figures.

Corresponding numerals and symbols in the different figures generally refer to corresponding parts unless otherwise indicated. The figures are drawn to clearly illustrate the relevant aspects of the disclosure and are not necessarily drawn to scale.

DETAILED DESCRIPTION

The following disclosure provides many different examples for implementing different features. Specific examples of components and arrangements are described below to simplify the present disclosure. These are, of course, merely examples and are not intended to be limiting.

Network switches are used for data packet forwarding in local networks. While network switches may generally operate at line rates under light loads, they may struggle with maintaining line rates under heavy loads. One source of performance issues is head-of-line blocking, which is a phenomenon where one congested port of a network switch obstructs the delivery of packets to other non-congested ports of the network switch. Packet pulling, such as Virtual Output Queueing (VOQ), is an architectural technique that allows network switches to maintain line rates under congestion by reducing head-of-line blocking. However packet pulling may increase latency of a network switch. Therefore, while packet pulling may increase network switch performance under heavy loads, it may decrease network switch performance under light loads. Increasing clock speeds is a rudimentary way to decrease latency of a network switch, but may be infeasible as the demand for network switch performance increases.

The present disclosure describes a network switch with a packet pulling architecture that also supports packet pushing. Packets are pushed from an input buffer of an input port to an output buffer of an output port over a data crossbar. An input queue of the input port transfers the packet from the input buffer to the output buffer. Concurrently with the transfer, the input queue sends a push request to an output queue of the output port over a request crossbar. The output queue controls reading from the output buffer and, by granting the push request, controls the reading of the packet from the output buffer. The output queue may also notify the input queue that the request was granted over a grant crossbar. Thus, the packet may be pushed from the input buffer to the output buffer without first negotiating a grant for the transfer.

In an example implementation, packet pushing may only be performed in some circumstances, such as when the network switch is under a light load. Under a heavy load, packet pulling (e.g., VOQ) may be performed in lieu of packet pushing. Thus, a network switch may have improved performance under both light loads (as a result of packet pushing) and heavy loads (as a result of packet pulling). Additionally, low latency may be maintained for short bursts of traffic and for low-bandwidth packet flows. Dynamically performing packet pushing/pulling based on the load of the network switch may be more efficient than only performing packet pushing/pulling on their own.

Figure 1:
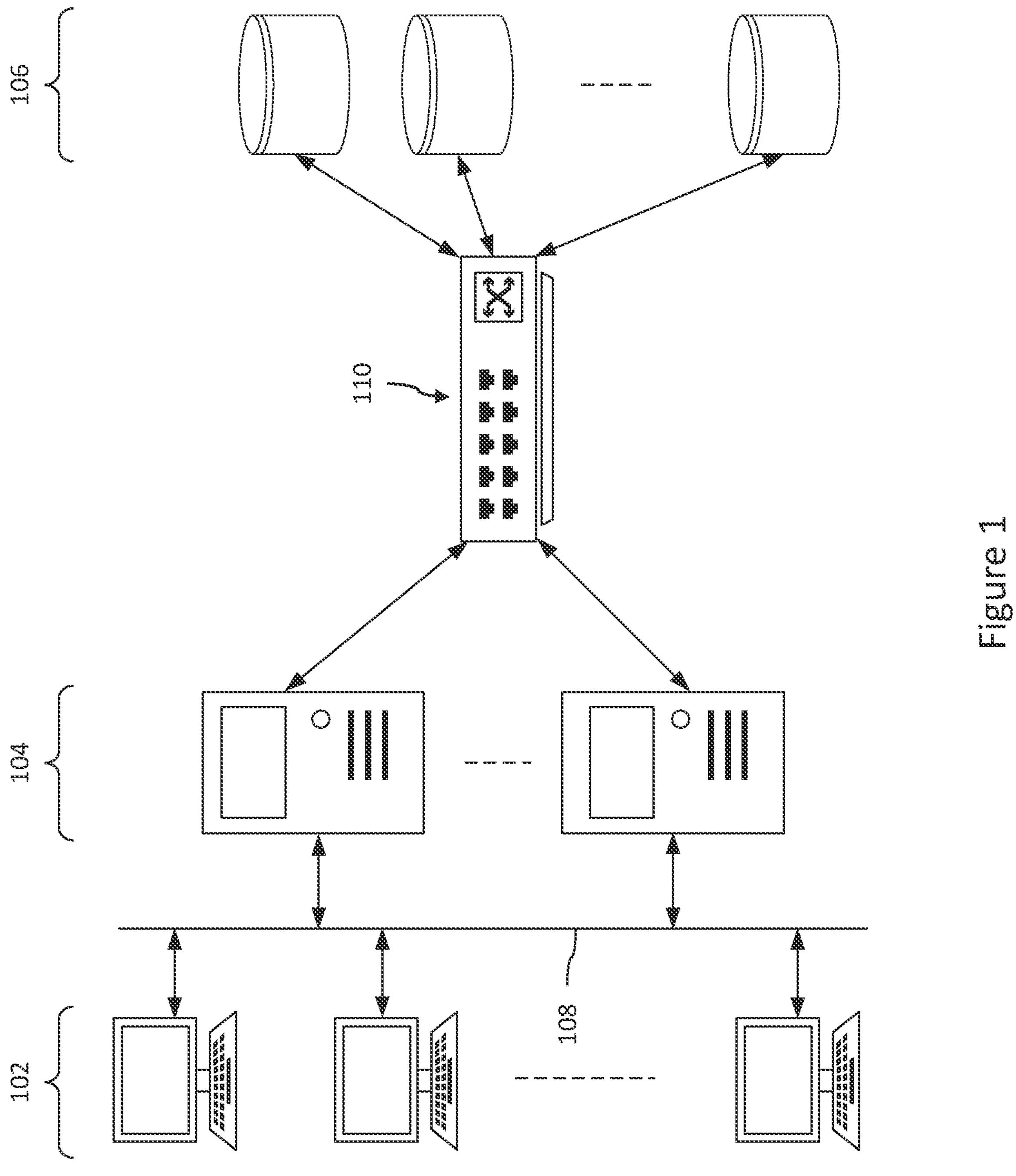
FIG. 1 is a diagram of a network system, according to some implementations.

FIG. 1 is a diagram of a network system 100, according to some implementations. The network system 100 may be a high performance network that is part of a high-performance computing (HPC) environment. In the network system 100, client devices 102 act as sending nodes and access servers 104. The servers 104 interact with one another, and may interact with storage devices 106. The servers 104 and/or the storage devices 106 act as receiving nodes and provide software/services to the client devices 102. The servers 104 and/or the storage devices 106 may be part of an HPC cluster. The servers 104 and the storage devices 106 are only examples of devices that may be accessed by the client devices 102.

The client devices 102 interact with the servers 104 via a network 108. The network 108 may be any wired or wireless network that is adapted to facilitate communication between the client devices 102 and the servers 104. The client devices 102 and/or the servers 104 include network interface(s) for accessing the network 108. For example, the client devices 102 and/or the servers 104 may include network interface cards (NICs), wireless interface cards, or the like. The network 108 may include controllers, access points, switches, routers, or the like for forwarding traffic between the client devices 102 and the servers 104. The client devices 102 may be any electronic devices that are adapted to execute executable code. The servers 104 may be bare metal machines that are adapted to host cloud components (e.g., virtual machines, containers, etc.). The storage devices 106 may be network-attached storage (NAS) devices.

The servers 104 and the storage devices 106 are interconnected with each other via one or more network switches, including a network switch 110. The servers 104 and the storage devices 106 communicate with each other via packets that are transferred between sending and receiving nodes. The servers 104 and the storage devices 106 are only examples of devices that may be interconnected via the network switch 110. Other devices may be connected to the network switch 110. The packets may be routed by the network switch 110. The network switch 110 may have a high line rate, such as a line rate of 800 Gbps, 1600 Gbps, or higher. A high line rate may be desirable when the servers 104 and/or the storage devices 106 are part of an HPC cluster.

Figure 2:
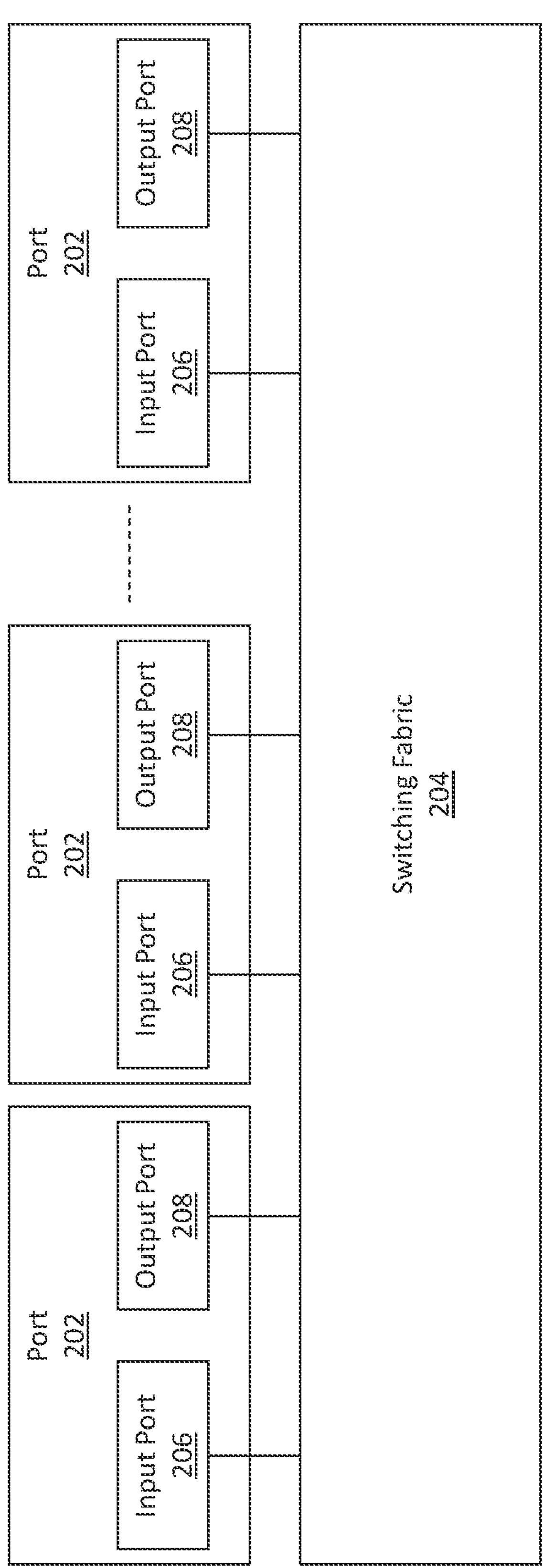
FIG. 2 is a block diagram of a network switch, according to some implementations.

FIG. 2 is a block diagram of a network switch 200, according to some implementations. The network switch 200 is an example of the network switch 110 previously described for FIG. 1. The network switch 200 includes ports 202 and a switching fabric 204. The ports 202 serve as connection points for nodes (e.g., servers, storage devices, etc.). The switching fabric 204 manages and forwards data packets between the ports 202.

Each port 202 includes an input port 206 and an output port 208. The input ports 206 are the ingress points through which packets enter the network switch 200. The output ports 208 are the egress points responsible for transmitting the packets to their designated destinations. When a packet arrives at an input port 206, the network switch 200 examines the packet's destination address to determine the appropriate output port 208 for transmission. This process, known as switching or forwarding, includes performing a lookup in a forwarding table of the network switch 200 to find the forwarding path for the packet.

Each input port 206 receives packets from a node connected to the input port 206, and sends the packets to the output ports 208, in a one-to-many configuration. An input port 206 controls how packets are sent to the output ports 208. Similarly, each output port 208 receives packets from the input ports 206, and sends the packets to a node connected to the output port 208, in a many-to-one configuration. An output port 208 controls how packets are received from the input ports 206.

The ports 202 (including the input ports 206 and the output ports 208) are interconnected via the switching fabric 204, which provides the necessary pathways for packets to move from the input ports 206 to the output ports 208. The switching fabric 204 links the input ports 206 and the output ports 208. Depending on the architecture of the network switch 200, the switching fabric 204 may be based on crossbar matrices, shared buses, shared memory, or the like. In an implementation, the switching fabric 204 includes multiple crossbars which are used for both control and data transmission between the input ports 206 and the output ports 208.

The components of the network switch 200 can be implemented as integrated circuits, such as in one or more integrated circuit die(s) and/or one or more integrated circuit package(s). For example, the network switch 200 may include a processor, an application-specific integrated circuit, a field-programmable gate array, memory, combinations thereof, or the like. One or more modules within the network switch 200 may be partially or wholly embodied as software and/or hardware for performing any functionality described herein. For example, the buffers, queues, crossbars, transmitters, receivers, fabrics, etc. described herein may each be embodied as logic blocks of an integrated circuit. In some implementations, the components of the network switch 200 are implemented across multiple integrated circuit dies/packages, which may be assembled together in a same chassis.

As subsequently described in greater detail, the network switch 200 has a hybrid architecture that integrates both packet pushing and packet pulling techniques. The network switch 200 is adapted to perform packet pushing if a packet is eligible for packet pushing, and is adapted to perform packet pulling if the packet is ineligible for packet pushing. Eligibility for packet pushing may be based on factors such as the load of the network switch 200, the traffic class of the traffic being routed, availability of buffer space at the output ports 208, etc. While using packet pulling may help the network switch 200 maintain line rates under heavy loads, packet pulling may also have increased latency as compared to packet pushing. By utilizing a hybrid architecture, the network switch 200 may advantageously maintain line rates under heavy loads (as a result of packet pulling) but may also maintain low latency under light loads (as a result of packet pushing).

Figure 3A:
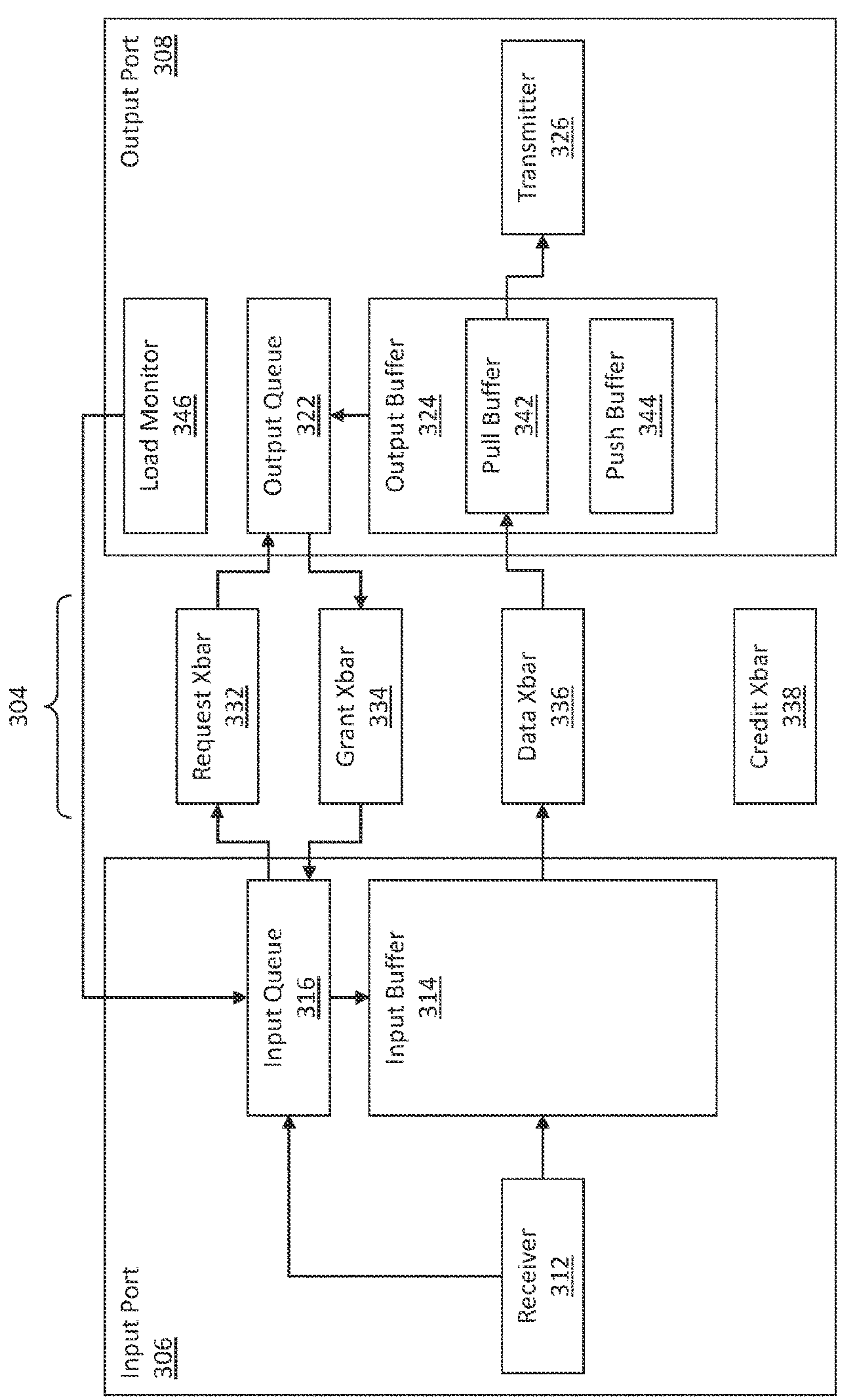
FIGS. 3A-3B are block diagrams of a network switch, according to some implementations.
Figure 3B:
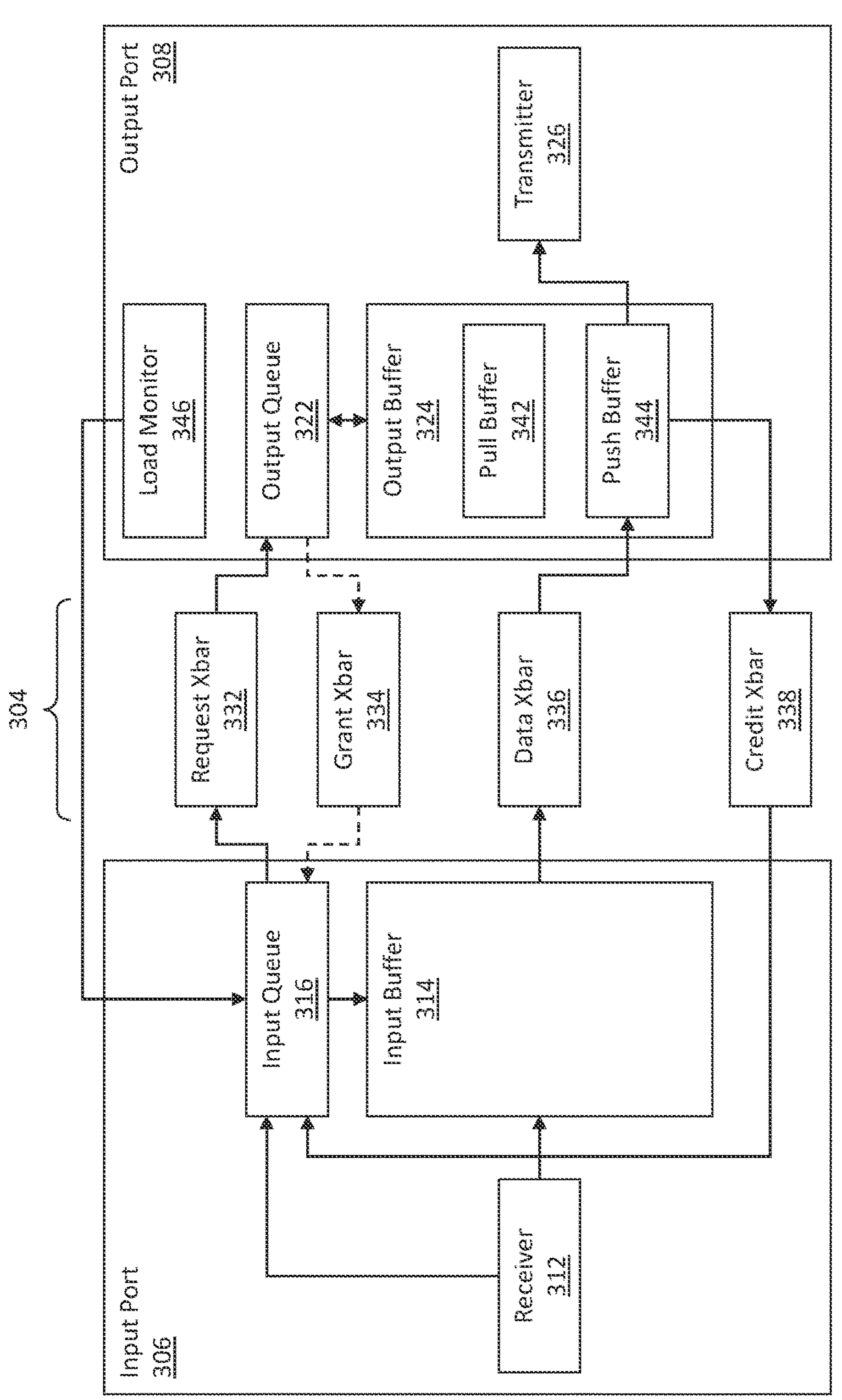

FIGS. 3A-3B are block diagrams of a network switch 300, according to some implementations. The network switch 300 is an example of the network switch 200 previously described for FIG. 2. Components of the network switch 300 (including components of a switching fabric 304, an input port 306, and an output port 308) are illustrated. FIG. 3A shows a logical flow during the pulling of packets from the input port 306 to the output port 308, while FIG. 3B shows a logical flow during the pushing of packets from the input port 306 to the output port 308. Although the forwarding of packets from one input port 306 to one output port 308 will be described, it should be appreciated that each input port 306 may send packets to multiple output ports 308, and each output port 308 may receive packets from multiple input ports 306.

Referring initially to FIGS. 3A-3B, components of the network switch 300 will be described. The input port 306 includes a receiver 312, an input buffer 314, and an input queue 316. The receiver 312 receives packets on a physical line from a source node that is connected via the input port 306. The packets are destined for a destination node that is connected via the output port 308. The source node and/or the destination node may be directly connected to the network switch 300, or there may be one or more network components (e.g., additional switches) between the network switch 300 and the source/destination node(s). The input buffer 314 is connected to the receiver 312. The received packets are stored in the input buffer 314.

The input queue 316 is connected to the input buffer 314 and the receiver 312. The input queue 316 is an input controller that controls transmitting of the packets from the input buffer 314 to output buffers of the various output ports 308. Requests to send packets to the various output ports 308 are queued at the input queue 316 by the receiver 312. The input queue 316 arbitrates among its queued requests and selects a request to process. The input queue 316 determines which output port 308 a packet for a selected request should be forwarded to. For example, an Ethernet lookup unit (not separately illustrated) may extract appropriate header(s) from the packet and use them to perform address translation for the destination node of the packet. The input queue 316 may receive the lookup result from the Ethernet lookup unit.

The output port 308 includes an output queue 322, an output buffer 324, and a transmitter 326. The output queue 322 is an output controller that controls receiving of packets in the output buffer 324 from input buffers of the various input ports 306. Requests to receive packets from the various input ports 306 are queued at the output queue 322. The output queue 322 arbitrates among its queued requests and selects a request to process. The output buffer 324 is connected to the output queue 322. The received packets are stored in the output buffer 324. The transmitter 326 is connected to the output buffer 324. The transmitter 326 reads packets from the output buffer 324 and transmits the packets to the destination nodes by sending signals down a physical line. Thus, by controlling the receiving of packets in the output buffer 324, the output queue 322 effectively controls reading of the packets from the output buffer 324 by the transmitter 326.

As previously noted, the network switch 300 may support packet pulling. Packet pulling, such as Virtual Output Queueing (VOQ), is an architectural technique that allows network switches to maintain line rates under congestion by reducing head-of-line blocking. An input queue 316 may maintain a virtual queue for each of the output ports 308. As a result, if congestion occurs at an output port 308, the virtual queue for that output port 308 may be blocked, but the virtual queues for other output ports 308 may continue being processing. Thus, congestion management and/or traffic shaping properties may be supported by the network switch 300.

The switching fabric 304 includes multiple crossbars that are different from one another. In this example, the switching fabric 304 includes a request crossbar 332, a grant crossbar 334, a data crossbar 336, and a credit crossbar 338. The request crossbar 332 and the grant crossbar 334 are connected to the input queue 316 of each input port 306, and to the output queue 322 of each output port 308. As subsequently described in greater detail, transfer requests (e.g., pushing/pulling requests) will be sent over the request crossbar 332, while transfer grants (e.g., pushing/pulling grants) will be sent over the grant crossbar 334. The data crossbar 336 is connected to the input buffers 314 of the input ports 306, and to the output buffers 324 of the output ports 308. The credit crossbar 338 is connected to the input queues 316 of the input ports 306, and to the output buffers 324 of the output ports 308. As subsequently described in greater detail, packets will be transferred over the data crossbar 336, and credits for packet pushing will be returned over the credit crossbar 338.

Referring now to FIG. 3A, a logical flow for the pulling of packets from the input port 306 to the output port 308 will now be described. The receiver 312 receives a packet and stores the packet in the input buffer 314. A request to transfer the packet is queued at the input queue 316, which then selects the request for processing. The input queue 316 sends a pull request for the packet to the output queue 322 over the request crossbar 332. The pull request includes a description of the packet; for example, the request may include information from a header of the packet.

The pull request is queued at the output queue 322, which then selects the pull request for processing. The output queue 322 decides whether and when to grant the pull request. For example, the output queue 322 may decide which pull request to grant next based on the packet descriptions of the pull requests, and based on the current state of the output buffer 324. In response to the pull request being granted, the output queue 322 sends a pull grant to the input queue 316 over the grant crossbar 334.

The pull grant is a notification that instructs the input queue 316 to move the packet from the input buffer 314 to the output buffer 324. In response to receiving the pull grant, the input queue 316 transfers the packet from the input buffer 314 to the output buffer 324 over the data crossbar 336. The output buffer 324 includes a pull buffer 342. The pull buffer 342 is dedicated to the output port 308, and may be shared between each input port 306. The packet is transferred to the pull buffer 342 for the input port 306. The transmitter 326 then reads the packet from the output buffer 324 (e.g., from the pull buffer 342). Thus, the output queue 322 controls the reading of the packet by the transmitter 326 (and thus determines which packets are sent via the transmitter 326) by the granting of the pull request.

Referring now to FIG. 3B, a logical flow for the pushing of packets from the input port 306 to the output port 308 will now be described. The receiver 312 receives a packet and stores the packet in the input buffer 314. A request to transfer the packet is queued at the input queue 316, which then selects the request for processing. The input queue 316 determines that the request is a candidate for packet pushing. Criteria for whether a packet is eligible for packet pushing will be subsequently described. In response to the packet being ineligible for packet pushing, the packet may be sent to the output port 308 via packet pulling (as previously described for FIG. 3A) instead of packet pushing.

In response to the packet being eligible for packet pushing, multiple operations are performed in parallel. The input queue 316 sends a push request for the packet to the output queue 322 over the request crossbar 332. The push request includes a description of the packet; for example, the request may include information from a header of the packet. Simultaneously, the input queue 316 transfers the packet from the input buffer 314 to the output buffer 324 over the data crossbar 336. The output buffer 324 includes a push buffer 344 dedicated to each input port 306. The packet is transferred to the push buffer 344 for the input port 306.

The push request is queued at the output queue 322, which then selects the push request for processing. The push request informs the output port 308 that a packet is being/has been pushed to the push buffer 344 for the input port 306. The output queue 322 decides whether and when to grant the push request. For example, the output queue 322 may decide which push request to grant next based on the packet descriptions of the push requests, and based on the current state of the output buffer 324. In response to the push request being granted, the output queue 322 sends a push grant to the output buffer 324.

The push grant is a notification that tells the output buffer 324 that the push request has been granted. Notification of the grant is processed locally at the output port 308. In response to the push request being granted, multiple operations are performed in parallel. The transmitter 326 reads the packet from the output buffer 324 (e.g., from the push buffer 344). Thus, the output queue 322 controls the reading of the packet by the transmitter 326 (and thus determines which packets are sent via the transmitter 326) by the granting of the push request. Simultaneously, the output queue 322 also sends the push grant to the input queue 316 over the grant crossbar 334. The push grant alerts the input queue 316 to the granting of the push request. Because the push grant is sent in parallel with the reading of the packet from the output buffer 324, fewer traversals of the switching fabric 304 may be performed (as compared to packet pulling) before the push request is read by the transmitter 326. Packet forwarding latency may thus be reduced.

Each input port 306 manages its push buffers 344 at the output ports 308. The push buffers 344 have finite space. Use of a push buffer 344 by the input port 306 may be credited. The input port 306 may push packets to an output port 308 until it has consumed its available credit at the output port 308. The input queue 316 tracks its available credit at the push buffer 344 for the output port 308. Transferring a packet from the input buffer 314 to the output buffer 324 decrements the credit for the push buffer 344. Reading a packet from the output buffer 324 by the transmitter 326 increments the credit. When the transmitter 326 reads the packet from the push buffer 344, the output buffer 324 returns credit to the input queue 316 over the credit crossbar 338, such as by sending a credit return notification to the input queue 316. The input queue 316 may track the available credit at the push buffer 344 of each output port 308. For example, the input queue 316 may maintain a credit counter for the push buffer 344 of each output port 308. When a packet is pushed to a push buffer 344, the input queue 316 may decrement the credit counter for that push buffer 344. When a credit return notification is received from a push buffer 344, the input queue 316 may increment the credit counter for that push buffer 344.

Additionally or alternatively, use of a push buffer 344 by the input port 306 may be based on the traffic class of a packet. An input port 306 may use a push buffer 344 for some or all traffic classes. The traffic class of a packet may be indicated in a header for the packet. In some implementations, the input port 306 uses the push buffer 344 only for packets in particular traffic class(es). The push buffer 344 may be shared between the particular traffic class(es). In some implementations, the input port 306 uses the push buffer 344 for packets in any traffic class.

Load information is collected at each output port 308 and distributed to the input ports 306. The load information may be used to determine whether an output port 308 is lightly loaded or heavily loaded. The load of an output port 308 may be based on the load of its output queue 322, e.g., based on the quantity of outstanding requests queued at the output queue 322. In some implementations, a load monitor 346 at an output port 308 may collect load information for the output port 308, and send that load information to an input queue 316 of an input port 306 over the switching fabric 304. The load information may be sent over a crossbar of the switching fabric 304. The load information may include the quantity of outstanding requests queued at the output queue 322, which may or may not be grouped by traffic class. The input queue 316 may track the load information for the output queue 322, and use it to determine whether to push packet(s) to the output port 308.

The criteria for determining whether a packet is eligible for packet pushing may be based on the load of the output port 308. Specifically, when determining whether a request is a candidate for packet pushing, the input queue 316 evaluates the load information received from the load monitor 346 of the output port 308. The packet may be eligible for packet pushing if the load information indicates the output port 308 is lightly loaded, while packet may be ineligible for packet pushing if the load information indicates the output port 308 is heavily loaded. The output port 308 may be lightly loaded when the quantity of outstanding requests queued at the output queue 322 is below a predetermined threshold. In some implementations, all types of outstanding requests queued at the output queue 322 are considered when determining if the output port 308 is heavily/lightly loaded. In some implementations, only particular types of outstanding requests queued at the output queue 322 are considered when determining if the output port 308 is heavily/lightly loaded. For example, when the quantity of outstanding requests at the output queue 322 is grouped by traffic class, only requests to forward packets of a particular traffic class may be considered when determining if the output port 308 is heavily/lightly loaded. Additionally, the outstanding requests may include the outstanding pull requests, or a combination of the outstanding pull requests and the outstanding push requests.

When the quantity of outstanding requests at the output queue 322 is grouped by traffic class, the evaluation of the load of the output port 308 may be for a particular traffic class. In other words, an output port 308 may be considered heavily loaded for one traffic class and lightly loaded for another traffic class. In such an implementation, a packet may be eligible for packet pushing if it is part of a lightly loaded traffic class, and may be ineligible for packet pushing if it is part of a heavily loaded traffic class.

The criteria for determining whether a packet is eligible for packet pushing is also based on whether credit is available at the output buffer 324 (e.g., the push buffer 344) for the input queue 316. The available credit is considered in addition to the load information of the output port 308. Thus, even if the output port 308 is lightly loaded, the packet may still be ineligible for packet pushing if the input queue 316 lacks available credit at the push buffer 344.

The criteria for determining whether a packet is eligible for packet pushing may also be based on a traffic class of the packet. The traffic class of the packet may be considered in addition to the available credit at the push buffer 344 and/or the load information of the output port 308. Thus, even if there is available credit and/or the output port 308 is lightly loaded, the packet may still be ineligible for packet pushing if the traffic class of the packet is not a particular traffic class.

Some variations are contemplated. Additionally or alternatively, the traffic class of the packet may be considered independently of the load information of the output port 308. For example, packets of a particular traffic class may be eligible for packet pushing even when the output port 308 is heavily loaded. It may be advantageous to push particular classes of traffic even if the output port 308 is heavily loaded.

A packet flow may be forwarded from the input port 306 to the output port 308 using a combination of packet pulling (as previously described for FIG. 3A) and packet pushing (as previously described for FIG. 3B). For example, depending on whether the packets are candidates for packet pushing, a first packet of the packet flow may be forwarded using packet pushing while a second packet of the packet flow may be forwarded using packet pulling. A packet flow is an ordered sequence of packets. The ordering of the packets in a packet flow should be maintained when forwarding the packet flow, such that the transmitter 326 reads the packets of the packet flow from the output buffer 324 in the desired order. However, when the packets of a packet flow are forwarded using a combination of packet pulling and pushing, packets of the packet flow may arrive at the output port 308 out of order as a result of packet pushing having lower latency than packet pulling.

In some implementations, the output queue 322 assigns a sequence number to each packet of a packet flow based on the ordering of the packets in the packet flow. Specifically, the output queue 322 assigns sequence numbers to transfer requests (e.g., push/pull requests) for packets of a packet flow in the order the requests are received. When the output queue 322 grants a pull request (as in FIG. 3A), the pull grant sent to the input queue 316 includes the sequence number for that request's packet. The sequence number for the packet is included with the packet when it is transferred from the input buffer 314 to the output buffer 324 (e.g., the pull buffer 342). When the output queue 322 grants a push request (as in FIG. 3B), the push grant sent to output buffer 324 is stored with the packet in the push buffer 344. In either case, both the packet and the sequence number for the packet are stored in the output buffer 324. The transmitter 326 reads the packets from the output buffer 324 in the order of their sequence numbers. For example, when the output buffer 324 contains both a first packet and a second packet of a packet flow, the packet with a lower sequence number may be read from the output buffer 324 before the packet with a higher sequence number. Thus, the transmitter 326 reads the packets of the packet flow from the output buffer 324 in the desired order, even when the packets are transferred to the output buffer 324 out of order.

The sequence numbers may be assigned using any suitable sequencing technique. In some implementations, the output queue 322 has a sequencer (or counter) for each input port 306, and each time the output queue 322 grants a transfer request, it uses the value of the sequencer as the sequence number and increments the sequencer. In some implementations, an output queue 322 includes multiple sequencers for each input port 306, such as different sequencers for different traffic classes, and each time the output queue 322 grants a transfer request for a traffic class, it uses the value of sequencer for that traffic class as the sequence number.

When forwarding a packet flow, the network switch 300 may transition from a first forwarding technique (e.g., packet pulling/pushing) to a second forwarding technique (e.g., packet pushing/pulling) partway through processing. The network switch 300 may transition between packet pushing and packet pulling on a per-flow basis. For example, a packet flow may be forwarded by forwarding some packets using packet pushing and then transitioning to forwarding other packets using packet pulling. A packet may be forwarded using packet pushing in response to determining the packet is the first packet in the packet flow. A packet flow may transition from pushing to pulling any time, such as when the available credit at the push buffer 344 has been consumed. Likewise, a packet flow may be forwarded by forwarding some packets using packet pulling and then transitioning to forwarding other packets using packet pushing. A packet flow may transition from pulling to pushing based on one or more heuristics. In some implementations, a packet flow may transition from pulling to pushing when there are no outstanding requests queued at the output queue 322. In some implementations, a packet flow may transition from pulling to pushing when the output port 308 is lightly loaded, e.g., when the quantity of outstanding requests queued at the output queue 322 is low, such as below a predetermined threshold. In some implementations, a packet flow may transition from pulling to pushing when packet(s) of the packet flow are detected as being from a particular application or having a particular traffic pattern. The packet forwarding technique may be transitioned to optimize for different applications or traffic patterns.

Figure 4:
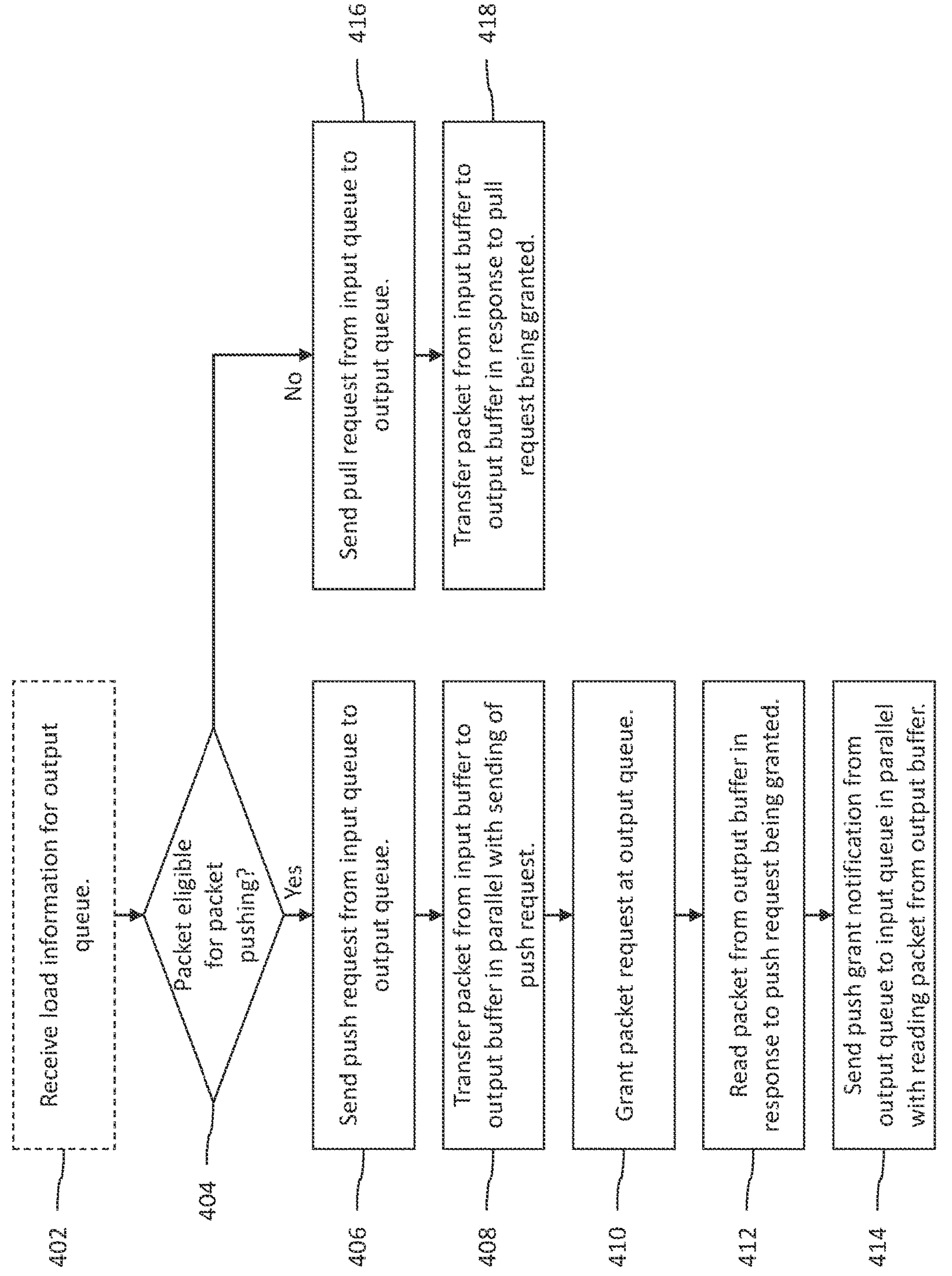
FIG. 4 is a diagram of a packet forwarding method, according to some implementations.

FIG. 4 is a diagram of a packet forwarding method 400, according to some implementations. The packet forwarding method 400 will be described in conjunction with FIGS. 3A-3B. The packet forwarding method 400 may be performed by the network switch 300 during the forwarding of a packet from an input port 306 to an output port 308.

The network switch 300 optionally performs a step 402 of receiving load information for the output queue, the load information comprising a quantity of outstanding requests queued at the output queue. Specifically, the load information is for an output queue 322 of the output port 308. The load information is received by an input queue 316 of the input port 306. The load information indicates the load of the output port 308. For example, the load information may include a quantity of outstanding requests queued at the output queue 322. The quantity of outstanding requests may be grouped by traffic class.

The network switch 300 performs a step 404 of determining whether a packet is eligible for packet pushing. The determination may be performed by the input queue 316 of the input port 306. The packet's eligibility for packet pushing may be based on the load of the output queue 322. Specifically, the packet may be eligible for packet pushing when the quantity of outstanding requests (e.g., pull requests or pull and push requests) queued at the output queue 322 is below a predetermined threshold. The quantity of outstanding requests that is considered may be the overall quantity of outstanding requests, or the quantity of outstanding requests for a particular traffic class group. Additionally or alternatively, the packet's eligibility for packet pushing may be based on other considerations. For example, determining whether the packet is eligible for packet pushing may be based on whether credit is available at the output buffer 324 for the input queue 316. Likewise, determining whether the packet is eligible for packet pushing may be based on a traffic class of the packet. Similarly, determining whether the packet is eligible for packet pushing may be based on the packet being a first packet (e.g., initial packet) in a packet flow.

If the packet is eligible for packet pushing, a first set of operations is performed. The network switch 300 performs a step 406 of sending a push request from an input queue to an output queue in response to the packet being eligible for packet pushing, the push request comprising a description of the packet. Specifically, a push request is sent from the input queue 316 to the output queue 322 in response to the packet being eligible for packet pushing. The push request may be sent over a request crossbar 332 that is connected to the input queue 316 and to the output queue 322. The push request is queued at the output queue 322.

The network switch 300 performs a step 408 of transferring the packet from an input buffer to an output buffer in parallel with the sending of the push request. Specifically, the packet is transferred from an input buffer 314 of the input port 306 to an output buffer 324 of the output port 308, in parallel with the sending of the push request. The packet is transferred to the output buffer 324 without waiting for the push request to be granted. Thus, steps 406 and 408 may be performed simultaneously. The packet may be transferred over a data crossbar 336 that is connected to the input buffer 314 and to the output buffer 324. Transferring the packet from the input buffer 314 to the output buffer 324 decrements the credit available at the output buffer 324 for the input queue 316.

The network switch 300 performs a step 410 of granting the push request at the output queue based on the description of the packet. Specifically, the push request is granted at the output queue 322.

The network switch 300 performs a step 412 of reading the packet from the output buffer in response to the push request being granted. Specifically, the packet is read from the output buffer 324 in response to the push request being granted. The reading may be performed by the transmitter 326, under control of the output queue 322. Reading the packet from the output buffer 324 increments the credit available at the output buffer 324 for the input queue 316.

The network switch 300 performs a step 414 of sending a push grant from the output queue to the input queue in parallel with the reading the packet from the output buffer. Specifically, a push grant is sent from the output queue 322 to the input queue 316 in parallel with the reading of the packet from the output buffer 324. Thus, steps 412 and 414 may be performed simultaneously. The push grant may also be sent from the output queue 322 to the output buffer 324, which may trigger the reading of the packet from the output buffer 324. The push request may be granted by the output queue 322 when it selects the push request for processing from among its queued requests. The push grant may be sent over a grant crossbar 334 that is connected to the input queue 316 and to the output queue 322. When the push request is granted, if the packet is part of a packet flow, the output queue 322 may assign a sequence number to the packet based on ordering of the packet in the packet flow.

If the packet is ineligible for packet pushing, a second set of operations is performed. The network switch 300 performs a step 416 of sending a pull request from the input queue to the output queue in response to the packet being ineligible for packet pushing. Specifically, a pull request is sent from the input queue 316 to the output queue 322 in response to the packet being ineligible for packet pushing. The pull request may be sent over a request crossbar 332 that is connected to the input queue 316 and to the output queue 322. The pull request is queued at the output queue 322.

The network switch 300 performs a step 418 of transferring the packet from the input buffer to the output buffer in response to the pull request being granted. Specifically, the packet is transferred from the input buffer 314 to the output buffer 324 in response to the pull request being granted. The pull request may be granted by the output queue 322 when it selects the pull request for processing from among its queued requests. When the pull request is granted, if the packet is part of a packet flow, the output queue 322 may assign a sequence number to the packet based on ordering of the packet in the packet flow. The output queue 322 then sends a pull grant (including the sequence number) to the input queue 316. The pull grant may be sent over a grant crossbar 334 that is connected to the input queue 316 and to the output queue 322. In response to receiving the pull grant, the input queue 316 transfers the packet to the output buffer 324. The packet is transferred to the output buffer 324 after waiting for the pull request to be granted. Thus, steps 416 and 418 may be performed consecutively.

Figure 5:
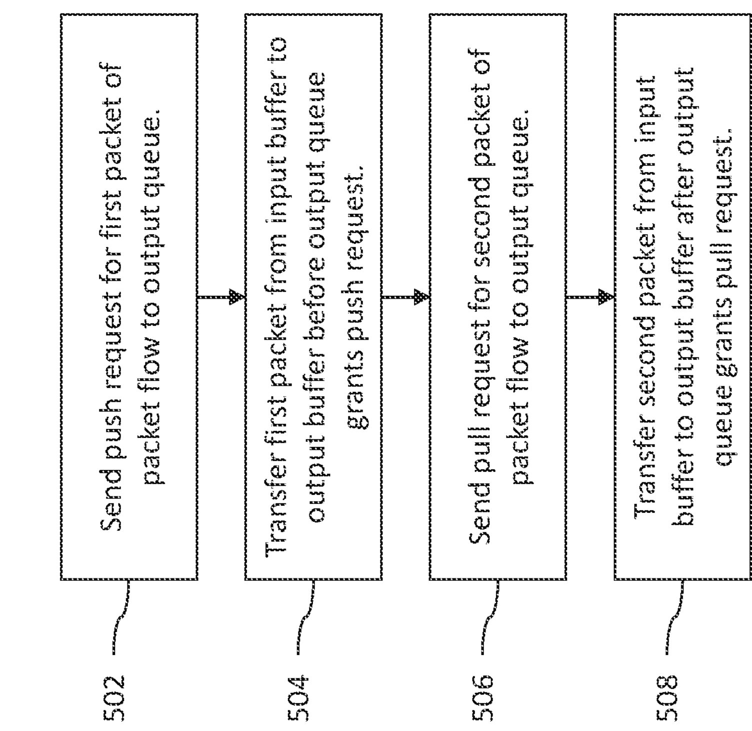
FIG. 5 is a diagram of a flow forwarding method, according to some implementations.

FIG. 5 is a diagram of a flow forwarding method 500, according to some implementations. The flow forwarding method 500 will be described in conjunction with FIGS. 3A-3B. The flow forwarding method 500 may be performed by the network switch 300 (particularly, the input queue 316) during the forwarding of a packet flow from an input port 306 to an output port 308.

The network switch 300 performs a step 502 of sending a push request for a first packet of a packet flow to the output queue. Specifically, a push request for a first packet of a packet flow is sent to an output queue 322 of the output port 308. The output queue 322 is configured to control receiving of packets in an output buffer 324 of the output port 308 from an input buffer 314 of the input port 306. The push request may be sent in response to the first packet having a particular traffic class and/or in response to credit being available at the output buffer 324.

The network switch 300 performs a step 504 of transferring the first packet from the input buffer to the output buffer before the output queue grants the push request. Specifically, the first packet is transferred from the input buffer 314 to the output buffer 324 before the output queue 322 grants the push request. Thus, the first packet is transferred to the output buffer 324 without waiting for the push request to be granted.

The network switch 300 performs a step 506 of sending a pull request for a second packet of the packet flow to the output queue. Specifically, a pull request for a second packet of the packet flow is sent to the output queue 322. The pull request may be sent in response to credit being unavailable at the output buffer 324 or in response to the load of the output queue 322 being excessive.

The network switch 300 performs a step 508 of transferring the second packet from the input buffer to the output buffer after the output queue grants the pull request. Specifically, the second packet is transferred from the input buffer 314 to the output buffer 324 after the output queue 322 grants the pull request. Thus, the second packet is transferred to the output buffer 324 after waiting for the pull request to be granted.

When the push request and the pull request are granted, sequence numbers are assigned to the first packet and the second packet by the output queue 322. The sequence numbers are based on an order of the first packet and the second packet in the packet flow. Subsequently, the transmitter 326 reads the first packet and the second packet from the output buffer in order of the sequence numbers.

The techniques of the present disclosure may achieve advantages. By utilizing a hybrid architecture that integrates both packet pushing and packet pulling techniques, the network switch 300 may advantageously maintain line rates under heavy loads (as a result of packet pulling) but may also maintain low latency under light loads (as a result of packet pushing). The network switch 300 may thus maintain the congestion management and shaping properties of VOQ, while delivering low latencies under light loads, burst traffic, and low-bandwidth packet flows.

Figure 6:
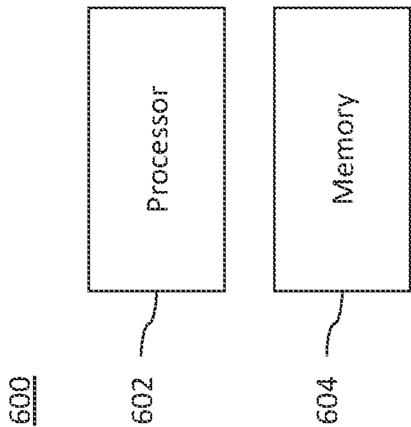
FIG. 6 is a block diagram of a network switch, according to some implementations.

FIG. 6 is a block diagram of a network switch 600, according to some implementations. The network switch 600 is an example of the network switch 200 previously described for FIG. 2. The network switch 600 may include a processor 602 and a memory 604. The memory 604 may be a non-transitory computer readable medium that stores programming for execution by the processor. In this implementation, one or more modules within the network switch 600 may be partially or wholly embodied as software for performing any functionality described herein.

In an example implementation, a device includes: an output buffer; a data crossbar connected to the output buffer; an input buffer connected to the data crossbar; an input queue configured to transfer a packet from the input buffer to the output buffer over the data crossbar in response to the packet being eligible for packet pushing, and to send a push request in parallel with transferring the packet to the output buffer; a request crossbar connected to the input queue; and an output queue configured to receive the push request from the input queue over the request crossbar, and to control reading of the packet from the output buffer in response to granting the push request. In some implementations, the device further includes: a grant crossbar connected to the output queue and to the input queue, the output queue further configured to send a push grant from the output queue to the input queue over the grant crossbar in parallel with controlling the reading the packet. In some implementations of the device, the packet is eligible for packet pushing when credit is available at the output buffer for the input queue. In some implementations of the device, the packet is eligible for packet pushing when the packet is of a particular traffic class. In some implementations of the device, the packet is eligible for packet pushing when a quantity of outstanding requests queued at the output queue is below a predetermined threshold. In some implementations of the device, the output queue is further configured to assign a sequence number to the packet based on ordering of the packet in a packet flow.

In an example implementation, a device includes: an input buffer; an output buffer connected to the input buffer; an output queue connected to the output buffer, the output queue configured to control receiving of packets in the output buffer from the input buffer; and an input queue connected to the output queue and the input buffer, the input queue configured to: send a push request for a first packet of a packet flow to the output queue; transfer the first packet from the input buffer to the output buffer before the output queue grants the push request; send a pull request for a second packet of the packet flow to the output queue; and transfer the second packet from the input buffer to the output buffer after the output queue grants the pull request. In some implementations of the device, the output queue is further configured to assign sequence numbers to the first packet and the second packet based on an order of the first packet and the second packet in the packet flow. In some implementations, the device further includes: a transmitter configured to read the first packet and the second packet from the output buffer in order of the sequence numbers. In some implementations of the device, the input queue is configured to send the push request in response to credit being available at the output queue and in response to the first packet having a particular traffic class. In some implementations, the device further includes: a credit crossbar connected to the input queue and to the output buffer, the output buffer further configured to return credit to the input queue over the credit crossbar.

In an example implementation, a method includes: determining whether a packet is eligible for packet pushing; sending a push request from an input queue to an output queue in response to the packet being eligible for packet pushing, the push request comprising a description of the packet; transferring the packet from an input buffer to an output buffer in parallel with the sending of the push request; granting the push request at the output queue based on the description of the packet; reading the packet from the output buffer in response to the push request being granted; and sending a push grant from the output queue to the input queue in parallel with the reading the packet from the output buffer. In some implementations of the method, determining whether the packet is eligible for packet pushing is based on whether credit is available at the output buffer for the input queue, transferring the packet from the input buffer to the output buffer decrements the credit, and reading the packet from the output buffer increments the credit. In some implementations of the method, determining whether the packet is eligible for packet pushing is based on a traffic class of the packet. In some implementations of the method, determining whether the packet is eligible for packet pushing is based on a load of the output queue. In some implementations, the method further includes: receiving load information for the output queue, the load information including a quantity of outstanding requests queued at the output queue, where the packet is eligible for packet pushing when the quantity of outstanding requests queued at the output queue is below a predetermined threshold. In some implementations of the method, the quantity of outstanding requests is grouped by traffic class and the load of the output queue is based on a particular traffic class. In some implementations, the method further includes: sending a pull request from the input queue to the output queue in response to the packet being ineligible for packet pushing; and transferring the packet from the input buffer to the output buffer in response to the pull request being granted. In some implementations, the method further includes: assigning a sequence number to the packet based on ordering of the packet in a packet flow, where determining whether the packet is eligible for packet pushing is based on the packet being first in the packet flow. In some implementations of the method, the push request is sent over a request crossbar that is connected to the input queue and to the output queue, the push grant is sent over a grant crossbar that is connected to the input queue and to the output queue, and the packet is transferred over a data crossbar that is connected to the input buffer and to the output buffer. The method may be implemented as instructions stored on a non-transitory computer readable medium.

The foregoing outlines features of several examples so that those skilled in the art may better understand the aspects of the present disclosure. Various modifications and combinations of the illustrative examples, as well as other examples, will be apparent to persons skilled in the art upon reference to the description. It is therefore intended that the appended claims encompass any such modifications.

What is claimed is:

1. A device comprising:
an output buffer;
a data crossbar connected to the output buffer;
an input buffer connected to the data crossbar;
an input queue configured to transfer a packet from the input buffer to the output buffer over the data crossbar in response to the packet being eligible for packet pushing, and to send a push request in parallel with transferring the packet to the output buffer, wherein the packet is stored in the output buffer before the push request is granted;
a request crossbar connected to the input queue; and
an output queue configured to receive the push request from the input queue over the request crossbar, and to control reading of the packet from the output buffer in response to granting the push request.

2. The device of claim 1, further comprising:
a grant crossbar connected to the output queue and to the input queue, the output queue further configured to send a push grant from the output queue to the input queue over the grant crossbar in parallel with controlling the reading the packet.

3. The device of claim 1, wherein the packet is eligible for packet pushing when credit is available at the output buffer for the input queue.

4. The device of claim 1, wherein the packet is eligible for packet pushing when the packet is of a particular traffic class.

5. The device of claim 1, wherein the packet is eligible for packet pushing when a quantity of outstanding requests queued at the output queue is below a predetermined threshold.

6. The device of claim 1, wherein the output queue is further configured to assign a sequence number to the packet based on ordering of the packet in a packet flow.

7. A device comprising:
an input port comprising:
an input buffer; and
an input queue connected to the input buffer; and
an output port comprising:
an output buffer connected to the input buffer; and
an output queue connected to the output buffer and to the input queue, the output queue configured to control receiving of packets in the output buffer from the input buffer;
wherein the input queue is configured to:
send a push request for a first packet of a packet flow to the output queue, the packet flow being forwarded from the input port to the output port;

transfer the first packet from the input buffer to the output buffer, wherein the first packet is stored in the output buffer before the output queue grants the push request;

send a pull request for a second packet of the packet flow to the output queue; and transfer the second packet from the input buffer to the output buffer after the output queue grants the pull request.

8. The device of claim 7, wherein the output queue is further configured to assign sequence numbers to the first packet and the second packet based on an order of the first packet and the second packet in the packet flow.

9. The device of claim 8, wherein the output port further comprises:

a transmitter configured to read the first packet and the second packet from the output buffer in order of the sequence numbers.

10. The device of claim 7, wherein the input queue is configured to send the push request in response to credit being available at the output queue and in response to the first packet having a particular traffic class.

11. The device of claim 10, further comprising:

a credit crossbar connected to the input queue and to the output buffer, the output buffer further configured to return credit to the input queue over the credit crossbar.

12. A method comprising:

determining whether a packet is eligible for packet pushing;

sending a push request from an input queue to an output queue in response to the packet being eligible for packet pushing, the push request comprising a description of the packet;

transferring the packet from an input buffer to an output buffer in parallel with the sending of the push request, wherein the packet is stored in the output buffer before the push request is granted;

granting the push request at the output queue based on the description of the packet;

reading the packet from the output buffer in response to the push request being granted; and sending a push grant from the output queue to the input queue in parallel with the reading the packet from the output buffer.

13. The method of claim 12, wherein determining whether the packet is eligible for packet pushing is based on whether credit is available at the output buffer for the input queue, transferring the packet from the input buffer to the output buffer decrements the credit, and reading the packet from the output buffer increments the credit.

14. The method of claim 12, wherein determining whether the packet is eligible for packet pushing is based on a traffic class of the packet.

15. The method of claim 12, wherein determining whether the packet is eligible for packet pushing is based on a load of the output queue.

16. The method of claim 15, further comprising:

receiving load information for the output queue, the load information comprising a quantity of outstanding requests queued at the output queue, wherein the packet is eligible for packet pushing when the quantity of outstanding requests queued at the output queue is below a predetermined threshold.

17. The method of claim 16, wherein the quantity of outstanding requests is grouped by traffic class and the load of the output queue is based on a particular traffic class.

18. The method of claim 12, further comprising:

sending a pull request from the input queue to the output queue in response to the packet being ineligible for packet pushing; and transferring the packet from the input buffer to the output buffer in response to the pull request being granted.

19. The method of claim 12, further comprising:

assigning a sequence number to the packet based on ordering of the packet in a packet flow, wherein determining whether the packet is eligible for packet pushing is based on the packet being first in the packet flow.

20. The method of claim 12, wherein the push request is sent over a request crossbar that is connected to the input queue and to the output queue, the push grant is sent over a grant crossbar that is connected to the input queue and to the output queue, and the packet is transferred over a data crossbar that is connected to the input buffer and to the output buffer.

* * * * *